J. T. Whipple,
Pump Valve.

No. 107,841.  Patented Sep. 27, 1870.

Witnesses
George Sinclair
Wm. Hasselbach

Inventor
James T. Whipple

UNITED STATES PATENT OFFICE.

JAMES T. WHIPPLE, OF CHICAGO, ILLINOIS.

IMPROVEMENT IN PUMP-VALVES.

Specification forming part of Letters Patent No. 107,841, dated September 27, 1870.

*To all whom it may concern:*

Be it known that I, JAMES T. WHIPPLE, of Chicago, in the county of Cook and State of Illinois, have invented a certain new and useful Improvement in Pump-Valves; and I do hereby declare the following to be a full and exact description thereof, reference being had to the accompanying drawing, making a part of this specification, in which—

Figure 1:
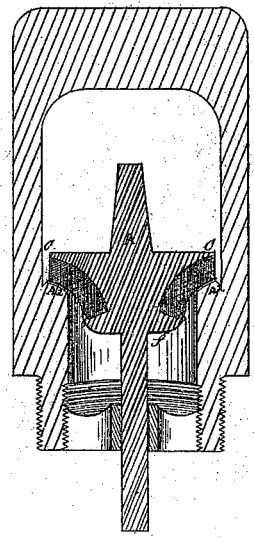
Figure 2:
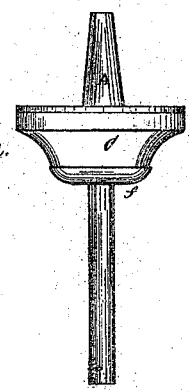

Figure 1 represents a vertical central section of the valve and valve-seat. Fig. 2 represents a perspective view of the valve complete with valve-seat removed.

Similar letters of reference where they occur denote like parts.

My invention consists in so constructing or shaping that portion of the valve which has heretofore come in contact with the valve-seat as to form an inclined or concaved elongated surface, over which is drawn a facing of rubber or any equivalent elastic substance, and is held against the side or oblique surface by enlarging the base of said valve, forming a projection and a flange upon and within which said facing is supported, whereby a cheap, durable, and effective valve is formed, the shape of which may be made to correspond with any desired oblique angle of valve-seat.

To enable others skilled in the art to make and use my invention, I will proceed to describe the same with reference to the drawing.

A represents the metallic part of the valve. The upper edge of the conical portion is made to protrude outward laterally over the periphery of the valve-seat, and its sides are cut away or formed on an inclined curved line downward toward its center.

C represents a facing, of rubber or other elastic substance, which is placed around the oblique or curved portion of said metal part of the valve, its lower edge resting upon the upper side of a projection, $f$, protruding outward and upward from the base of the valve, thus forming a flange, which comes against the outer and lower side of said facing C, holding it in its proper position to rest upon and against the surface of the valve-seat $A^2$, the angle of said surface corresponding with the angle of the valve, which, when properly adjusted, forms a secure and perfect water-tight joint. Said facing C may be made by perforating the center of a cylindrical piece of sheet-rubber or other like material, allowing the diameter of said perforation to be less than the diameter of the base of the valve. Thus, when said facing is drawn over projection or flange $f$, the elasticity of the material contracts the same, corresponding to the angle of the metal portion of the valve; or it may be made by casting the same of rubber in a mold approximating to the shape of the valve, and retained in the proper position by means of said projection and flange $f$.

My invention may be used on all metal valves where an inclined or curved surface is required.

Having thus described the nature and object of my invention, what I claim as new, and desire to secure by Letters Patent, is—

Facing C, when composed of any elastic substance and applied to the inclined or curved surface of the metal portion of valve A, substantially as and for the purpose specified.

JAMES T. WHIPPLE.

Witnesses:
GEORGE SINCLAIR,
WM. HASSELBACH.